United States Patent [19]
Garbuzov et al.

[11] Patent Number: 5,165,634
[45] Date of Patent: Nov. 24, 1992

[54] SUPPORT FOR MUSICAL INSTRUMENTS

[76] Inventors: Oleg Garbuzov; Leonid Garbuzov, both of 5873 Melrose Ave., Hollywood, Calif. 90038

[21] Appl. No.: 822,159

[22] Filed: Jan. 17, 1992

[51] Int. Cl.⁵ .......................................... F16M 11/38
[52] U.S. Cl. ..................................... 248/166; 84/327; 248/434
[58] Field of Search ............... 248/166, 165, 434, 173, 248/188.6, 176, 443, 178; 84/327

[56] References Cited

U.S. PATENT DOCUMENTS

| | | | |
|---|---|---|---|
| 1,464,279 | 8/1923 | Hindley | 248/167 X |
| 1,646,165 | 10/1927 | Navjoks | 248/160 X |
| 1,708,285 | 4/1929 | Truett | 248/166 X |
| 3,958,786 | 5/1976 | Mann | 248/176 |
| 4,352,480 | 10/1982 | Gathright | 84/327 X |
| 4,691,610 | 9/1987 | Gilbert | 248/178 X |
| 4,986,158 | 1/1991 | Johnson | 84/327 |

FOREIGN PATENT DOCUMENTS 342346 12/1959 Switzerland .................... 248/167

Primary Examiner—J. Franklin Foss
Attorney, Agent, or Firm—Allan M. Shapiro

[57] ABSTRACT

The support for musical instruments is a stand which is flat and compact in its folded position and which deploys into a 3-dimensional stand which is adjustable to receive and support different sizes and shapes of musical instruments. The support has a double T-bar base to which two base arms swing out to provide lateral support. A lower support frame is pivoted to swing up from the T-bar base, and it carries an instrument pocket or recess. The upper support frame is pivoted on the lower support frame and is detachably secured to the T-bar base. The upper support frame also carries an instrument pocket so that an instrument can lie in the two pockets to be securely supported.

20 Claims, 2 Drawing Sheets

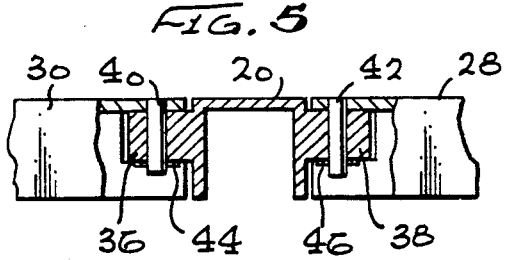
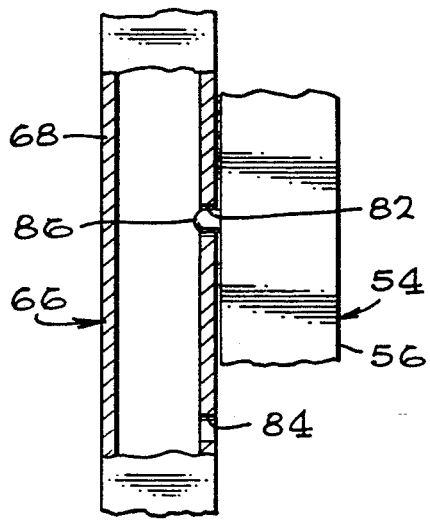
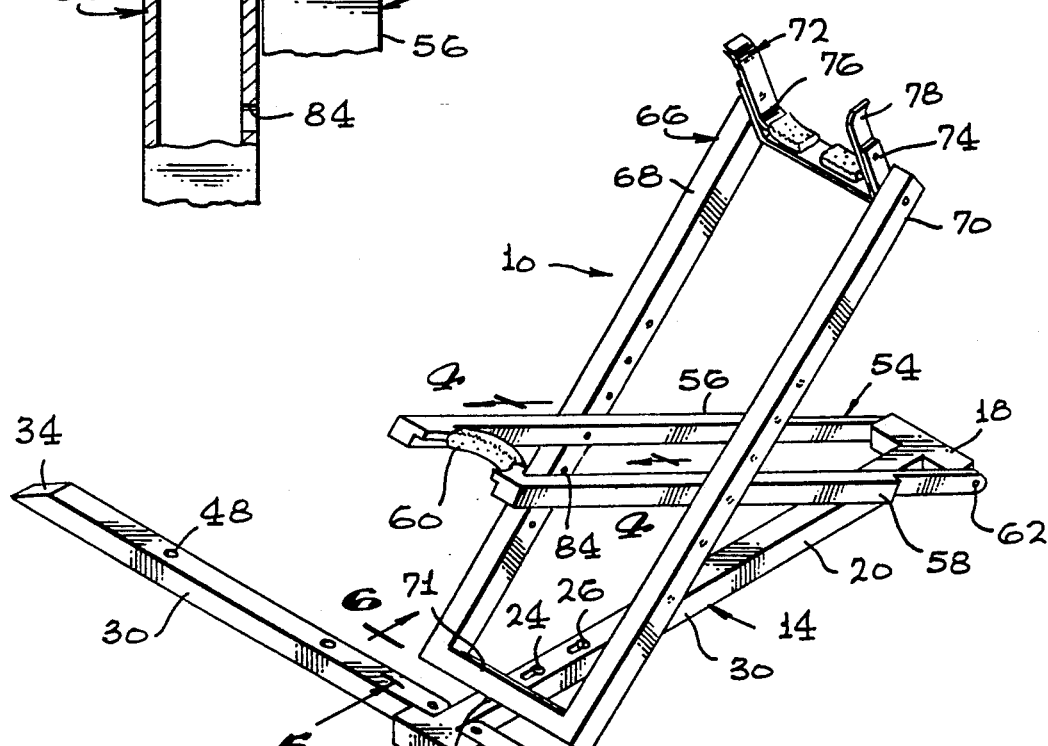
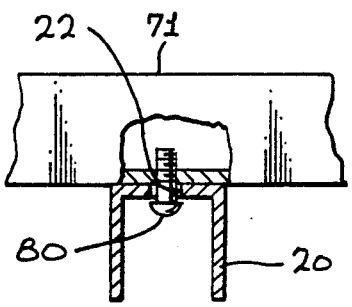

SUPPORT FOR MUSICAL INSTRUMENTS

FIELD OF THE INVENTION

This invention is directed to a support for musical instruments, and particularly a folding stand which folds into a flat, compact configuration and which is erected into a position where the instrument pockets can support a musical instrument.

BACKGROUND OF THE INVENTION

Most musical instruments are contained in protective cases for storage and transportation. These musical instruments are taken out of their cases, in some cases are assembled, and are then played. However, there is an intermediate condition wherein the instrument is not held in the hands for immediate play, and yet accessibility is required because the instrument is soon to be played. A stand is necessary to support the musical instrument in a position convenient to the musician so that he has quick access to the instrument. Such a support should not only be available to the instrumentalist at his base, but should also be available to him when he plays his instrument away from his base. Thus, the support should be readily foldable, transportable, and deployable so that convenience is achieved. In the folded condition, the support should be as flat as possible for convenience in transportation from one site to another.

SUMMARY OF THE INVENTION

In order to aid in the understanding of this invention, it can be stated in essentially summary form that it is directed to a support for musical instruments wherein the support has a base bar to which support arms are pivoted. A lower support frame is pivoted to the base bar and embraces the base arms when the base arms are folded in and the support frame is folded down. An upper support frame is pivoted to the lower support frame and is detachably attached to the base bar. In the folded position, the upper support frame embraces the lower support frame.

It is thus an object and advantage of this invention to provide a support for musical instruments wherein the support is foldable into a substantially flat structure for convenient storage and transportation and erects into a stable support which is adjustable for the support of various musical instruments.

It is another object and advantage of this invention to provide a support for musical instruments which can be inexpensively produced so as to be widely available and which is adjustable to provide support for various types and sizes of musical instruments.

It is a further object and advantage of this invention to provide a support for musical instruments which, in the folded position, lies in a flat, rectangular package and which, in the erected position, provides two instrument pockets for the support of a musical instrument.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 3 is an isometric view of the support in the erected position.

FIG. 4 is an enlarged section taken generally along line 4—4 of FIG. 3.

FIG. 5 is a section taken generally along line 513 5 of FIG. 3.

FIG. 6 is a section taken generally along line 6—6 of FIG. 3.

DESCRIPTION OF THE PREFERRED EMBODIMENT

Figure 1:
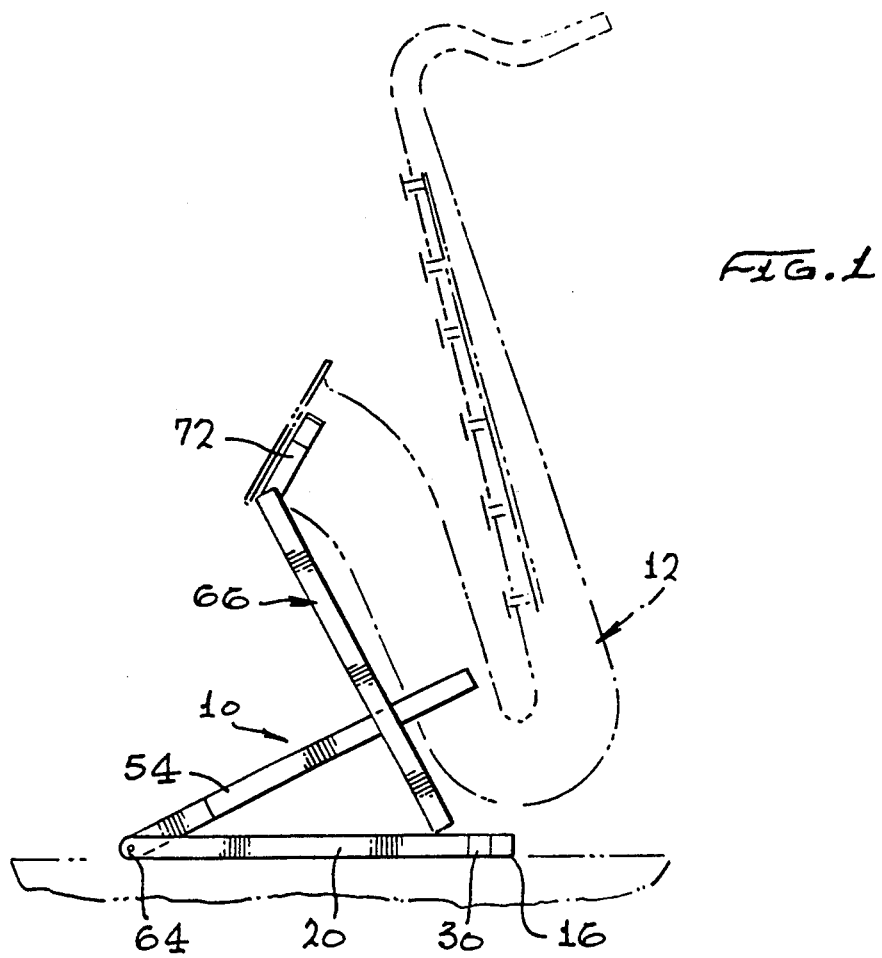
FIG. 1 is a side-elevation of the support for musical instruments in accordance with this invention shown in the erected position, and showing in dashed lines a saxophone being supported thereby.
Figure 2:
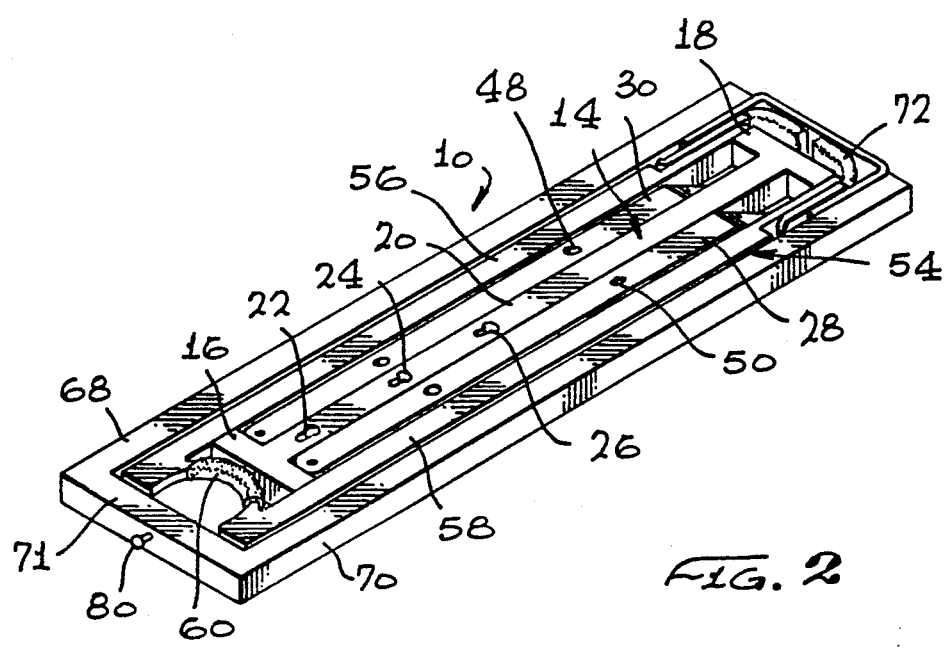
FIG. 2 is an isometric view of the support in the folded position.

The support for musical instruments in accordance with this invention is generally indicated at 10 in FIGS. 1, 2 and 3. While the support 10 is shown in FIG. 1 as supporting a saxophone 12, as the description of the support proceeds, it is clear that there are several adjustments so that the support can be arranged in other configurations for supporting other instruments, although these instruments are more likely to be wind instruments. The support 10 includes a base bar 14 with a tee on each end. The first tee 16 and the second tee 18 are shown in both FIGS. 2 and 3. The tees are connected by center bar 20. As seen in FIG. 5, the center bar is substantially square, but with an open bottom to represent an inverted U-shape. This configuration is desirable because each of the main members of the support 10 is expected to be formed by injection molding. Each of the tees is also in the form of an open bottom inverted U for this purpose. In addition, the base bar has several key-hole shaped fastening holes therein. Key holes 22, 24 and 26 are seen in FIG. 2. Key hole 22 is seen in FIG. 6, while key hole fastening holes 24 and 26 are seen in FIG. 3.

Base arms 28 and 30 are shown in the folded position in FIG. 2 and in the deployed position in FIGS. 3 and 5. At their outer ends, the base arms may be chamfered, as at 32 and 34. The length of the base arms is such that, when in the folded position, they fit between the first and second tees 16 and 18, as shown in FIG. 2. As seen in FIG. 5, the base bar has ears 36 and 38 formed at the junction of the center bar 20 and first tee 16. These ears have pivot holes therein. As seen in FIG. 5, pivot pins 40 and 42 are respectively secured in the base arms 30 and 28 and extend downward through the ears so that the base arms are able to swing from the folded position of FIG. 2 to the extended position of FIG. 3. The pivot pins preferably carry retainers thereon, such as press-on stops 44 and 46, to retain the base arms on the ears. When the base arms are swung to the extended position of FIG. 3, it is seen that tee 16 serves to limit the base arms to an outer position where they are in line and extend away from each other. The base arms preferably have several holes in the top thereof, such as holes 48 and 50. These holes may be used to place pins or cones thereon, such as pin 52. These pins or cones can receive auxiliary equipment to the musical instrument. The auxiliary equipment may be such equipment as a mouthpiece or a mute.

Lower support frame 54 is U-shaped and is formed with legs 56 and 58 joined with lower instrument pocket 60. As best seen in FIG. 2, the lower instrument pocket 60 is a U-shaped structure with padding thereon. The opposite ends of the legs 56 and 58 are thinner and are pivoted onto tee 18, as by pivot pin 62 (see FIG. 3) and pivot pin 64 (see FIG. 1). The length of the legs 56 and 58 and the shape of the instrument pocket 60 is such that, in the lowered position, the instrument pocket 60 just clears the tee 16, see FIG. 2.

Upper support frame 66 is also U-shaped. It has arms 68 and 70 which are joined at the lower end by cross bar 71. At its upper end, upper support frame 66 carries between its ends instrument pocket 72. The instrument pocket 72 is mounted on a U-shaped frame 74, which is pivoted on the free upper ends of the arms 68 and 70. Within the U-shaped frame 74 are two instrument-holding pads 76 and 78 which actually form the instrument pocket 72. The pads may be malleable to form into the appropriate shape to hold a particular instrument, and they are preferably padded, as indicated in FIG. 3. The size of the various parts is such that the instrument pocket 72 is rotated with its U-shaped frame pointed inwardly, and in this configuration, the upper support frame 66 embraces the lower support frame 58, as seen in FIG. 2. Furthermore, the lower support frame embraces the base bar 14 with its tees and embraces the base arms 28 and 30 when they are in the folded position shown in FIG. 2. Each of the frames, arms and legs is, in turn, U-shaped in cross section, as shown with respect to center bar 20 in FIGS. 5 and 6. When they are lying together, as shown in FIG. 2, the entire structure is rectangular, densely configured and as flat as the thickness of the various frame members. Thus, it is easily stowable and transportable.

When moving from the stowed or folded position in FIG. 2 to the raised position in FIG. 3, the instrument pocket 72 and cross bar 71 are raised. This swings the lower support frame 54 up from its planar position. Cross bar 71 carries key 80 thereon, see FIGS. 2 and 6. The key 80 is placed in one of the key holes 22, 24, 26 depending on the height desired. The base arms 28 and 30 are swung to the extended position shown in FIG. 3 to provide stability. The lower support frame 54 and the upper support frame 66 are pivoted together, as seen in FIGS. 3 and 4. The upper support frame has a plurality of pivot holes therein, with pivot holes 82 and 84 shown in FIG. 4. Corresponding holes are formed in arm 70. The lower support frame 54 carries a pivot pin on the outside of each of its legs 56 and 58. The pivot pin 86 on leg 56 is shown in FIG. 4. It can be appreciated that the arms of the upper support frame 66 are sufficiently flexible that the pivot pin on each leg of the lower support frame can be engaged in the selected one of the pivot holes in the upper support frame. In this way, selected positional geometry can be achieved for both the upper and lower instrument pockets. Consequently, those pockets can be positioned for receiving and supporting a particular musical instrument.

In repositioning the support into its folded position of FIG. 2, the reverse steps are followed. First, the instrument is removed, and next the base arms 28 and 30 are folded against the center bar 20. Key 80 is removed from its key hole, and the upper and lower support frames are lowered into the flat position. The upper instrument pocket is folded inwardly. If the pin 86 is engaged in the wrong pivot hole for the folded position, it can be reengaged in the proper pivot hole so that the longitudinal positioning of the two support frames returns to that shown in FIG. 2. In this way, quick deployment and folding are achieved in the support 10 so that it can be quickly set up to support an instrument and refolded for compact transportation and storage.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A support for musical instruments comprising:
   a base bar, said base bar having a flat bottom lying in a support plane;
   first and second base arms pivotally mounted on said base bar, said base arms swinging from a position where they lie against said base bar to an extended position wherein the under surface of said base arms lie on said support plane for supporting said base bar;
   a lower support frame, said lower support frame having a hinge end hinged to said base bar and an instrument pocket thereon for engaging a musical instrument for the support of the musical instrument;
   an upper support frame, said upper support frame being pivotally mounted with respect to said lower support frame and being detachably mounted with respect to said base bar so that when said upper support frame is attached to said base bar, said support is erected and when said upper support frame is detached from said base bar said support frames can be moved into a folded position wherein said lower support frame embraces said base arms when they are in the folded position and said upper support frame supports said lower support frame so that said upper and lower support frames also lie against said support plane when in the folded position; and
   an upper instrument support pocket mounted on said upper frame for engaging a musical instrument to be supported by said support.

2. The support of claim 1 wherein said upper support frame is detachably attachable to said base bar and in one of a plurality of selected positions.

3. The support of claim 2 wherein said upper support frame carries a projection thereon and there is a plurality of key hole openings in said base bar so that said projection can be inserted in a selected one of said key hole openings to detachably attach said upper support frame with respect to said base bar.

4. The support for musical instruments of claim 3 wherein at least some of said support is formed of U-shaped cross section and formed of synthetic polymer composition material.

5. The support for musical instruments of claim 1 wherein at least some of said support is formed of U-shaped cross section and formed of synthetic polymer composition material.

6. The support of claim 3 wherein said base bar has a tee head on at least one end thereof, said tee head being configured to pivot said lower support frame thereon and being sized so that when in the folded position said base arms lie against said base bar within the width of said tee.

7. The support of claim 6 wherein said upper support frame is pivotally mounted on said lower support frame at a selected pivot point to position said instrument pockets at selected positions.

8. The support of claim 1 wherein said base bar has a tee head on at least one end thereof, said tee head being configured to pivot said lower support frame thereon and being sized so that when in the folded position said base arms lie against said base bar within the width of said tee.

9. The support of claim 8 wherein said upper support frame is pivotally mounted on said lower support frame at a selected pivot point to position said instrument pockets at selected positions.

10. A support for musical instruments comprising:
a base bar having first and second ends, said base bar having a cross bar secured to the second end thereof to form a tee;
first and second base arms pivotally mounted on said base bar adjacent said first end of said base bar, said base bar and said tee defining a support plane on the under side thereof, said first and second base arms lying against said plane, said base arms having a folded position wherein they lie within the confines of said tee and extend to a position wherein they lie away from said base bar and lie against said support plane;
a lower support frame, said lower support frame having a pivot end and a support end, said lower support frame being pivotally mounted on said tee at said pivot end of said lower support frame, a lower instrument pocket on the support end of said lower support frame, said lower support frame being pivotable to a folded position wherein it embraces said folded base arms and lies against said support plane into a raised position wherein said upper instrument pocket is above said support plane;
an upper support frame, said upper support frame having an attachment end and a support end, said upper support frame having means on said attachment end for detachably attaching said attachment end with respect to said base bar, an upper instrument pocket on said support end of said upper support frame, said upper support frame being configured to embrace said lower support frame and said upper support frame is detached from said base bar and folded to a position where it lies against said support plane.

11. The support of claim 10 wherein said upper support frame is detachably attachable to said base bar at one of a plurality of selected positions.

12. The support of claim 10 wherein said upper support frame is pivotally mounted with respect to said lower support frame so that said upper and lower instrument pockets are positioned above said support plane by support from said base bar.

13. The support of claim 12 wherein said upper support frame is pivotally mounted with respect to said lower support frame on one of a plurality of selected pivots.

14. The support of claim 13 wherein there is a pivot pin on one of said support frames and a plurality of pivot holes in the other of said support frames so that said pivot pin can be positioned in a selected one of said pivot holes to pivot said upper support frame with respect to said lower support frame on a selected axis.

15. The support for musical instruments of claim 14 wherein at least some of said base bar, said base arms and said support frames is made in the form of a U-shaped channel which is positioned to be opened on the bottom.

16. The support for musical instruments of claim 15 wherein at least some of said base bar, said base arms, said upper and lower support frames is made of synthetic polymer composition material.

17. A support for musical instruments comprising:
a base bar, first and second base arms and lower and upper support frames nested together in the folded position and lying against a support plane, said base bar having a tee thereon and said first and second base arms lying on opposite sides of said base bar within the lateral limits of said tee;
said lower support frame being pivotally mounted on said tee so that said lower support frame can be raised above said support plane;
said upper support frame being pivotally mounted with respect to said lower support frame so that said upper support frame can be raised above said support plane, attachment means on said upper support frame for retaining said upper support frame and said lower support frame in a raised position, said base arms being deployable by pivoting away from said base bar when said upper and lower support frames are in their raised position;
an upper instrument pocket on said upper support frame and a lower instrument pocket on said lower support frame so that when said support in raised position, said support can support a musical instrument.

18. The support of claim 17 wherein said upper support frame is held in raised position by detachable attachment to said upper support frame with respect to said base bar.

19. The support of claim 18 wherein said detachable attachment is on one end of said upper support frame and said upper instrument pocket is on the other end of said upper support frame.

20. The support of claim 19 wherein said detachable attachment means of said upper support frame with respect to said base bar is a selectable attachment wherein one of a plurality of selected positions can be chosen and said pivot of said upper support frame with respect to said lower support frame is a selectable pivot in which one of a plurality of selectable pivot axes can be chosen.

* * * * *